United States Patent
Satz et al.

(10) Patent No.: US 8,358,208 B2
(45) Date of Patent: Jan. 22, 2013

(54) METHOD AND DEVICE FOR SENSING A BODY

(75) Inventors: Armin Satz, Arnoldstein (AT); Dirk Hammerschmidt, Villach (AT); Mario Motz, Wernberg (AT); Martin Orasch, Villach (AT)

(73) Assignee: Infineon Technologies AG, Neubiberg (DE)

( * ) Notice: Subject to any disclaimer, the term of this patent is extended or adjusted under 35 U.S.C. 154(b) by 573 days.

(21) Appl. No.: 12/268,926

(22) Filed: Nov. 11, 2008

(65) Prior Publication Data

US 2010/0117845 A1 May 13, 2010

(51) Int. Cl.
*G08B 13/26* (2006.01)

(52) U.S. Cl. .......................... 340/561; 340/562

(58) Field of Classification Search .................. 340/561, 340/562, 573.1, 573.7, 666, 667, 425.5, 627, 340/657; 280/734, 735; 180/271, 273; 307/10.1, 307/121; 324/679, 681, 686
See application file for complete search history.

(56) References Cited

U.S. PATENT DOCUMENTS

| | | | |
|---|---|---|---|
| 5,525,843 A | 6/1996 | Hoewing | |
| 5,624,132 A | 4/1997 | Blackburn et al. | |
| 5,760,688 A | 6/1998 | Kasai | |
| 5,821,860 A * | 10/1998 | Yokoyama et al. | 340/576 |
| 6,107,924 A * | 8/2000 | Kasai et al. | 340/627 |
| 6,329,913 B1 | 12/2001 | Shieh et al. | |
| 6,392,542 B1 * | 5/2002 | Stanley | 340/561 |
| 6,476,514 B1 | 11/2002 | Schondorf | |
| 6,483,055 B1 * | 11/2002 | Tanabe et al. | 200/85 A |
| 6,559,555 B1 * | 5/2003 | Saitou et al. | 307/10.1 |
| 6,683,534 B2 | 1/2004 | Patterson et al. | |
| 6,696,948 B2 | 2/2004 | Thompson et al. | |
| 6,703,845 B2 | 3/2004 | Stanley et al. | |
| 6,816,077 B1 | 11/2004 | Shieh et al. | |
| 7,109,872 B2 * | 9/2006 | Balaban et al. | 340/573.7 |
| 7,151,452 B2 | 12/2006 | Shieh | |
| 7,436,299 B2 * | 10/2008 | Shieh et al. | 340/561 |
| 7,701,338 B2 * | 4/2010 | Kamizono et al. | 340/561 |
| 7,796,017 B2 * | 9/2010 | Kiribayashi | 340/425.5 |
| 7,944,216 B2 * | 5/2011 | Brasseur et al. | 324/681 |
| 2007/0132559 A1 * | 6/2007 | Schleeh | 340/425.5 |

OTHER PUBLICATIONS

Andreuccetti, D., et al., "Calculation of the Dielectric Properties of Body Tissues in the frequency range 10 Hz-100 GHz," Italian National Research Council, Institute for Applied Physics, IFAC-CNR, Florence, Italy, http://niremf.ifac.cnr.it/tissprop/htmlclie/htmlclie.htm, 3 pages, downloaded Nov. 8, 2008.

Flexpoint Sensor Systems, Inc., "FLEXPOINT flexible sensor systems," http://www.flexpoint.com/sensorApps/automotive/seatOccupantDetection.htm, 2005, 15 pages, downloaded Sep. 12, 2008.

Gershenfeld, N.A., "Non-Contact Sensing of People and Things," Occupant Detection and Sensing for Smarter Air Bag Systems, 96C005, SAE Global Mobility Database PT-107, 2004, pp. 85-89.

* cited by examiner

*Primary Examiner* — Van T. Trieu
(74) *Attorney, Agent, or Firm* — Slater & Matsil, L.L.P.

(57) ABSTRACT

In an embodiment, a method for sensing a body includes measuring an impedance of a body occupying a seat over a plurality of frequencies and comparing the measured impedance of the body with a predefined body model. The method also includes determining whether the predefined body model corresponds to the measured impedance of the body.

30 Claims, 9 Drawing Sheets

METHOD AND DEVICE FOR SENSING A BODY

TECHNICAL FIELD

The present invention relates generally to a method and device for sensing a body, and more particularly to a method and device that senses whether a body occupies a seat.

BACKGROUND OF THE INVENTION

Airbag supplemental restraint systems (SRS) have become increasingly pervasive because of their ability to effectively protect vehicle occupants from serious injury in the event of a collision. The typical airbag system has an airbag, an inflation device, and a crash sensor that detects a sudden deceleration of the vehicle. In order to be effective, airbags are deployed rapidly at speeds of over 200 mph and are, therefore, prone to cause injury to small children or to passengers who are improperly restrained. To prevent such injuries, vehicle occupant sensors are employed to help determine whether or not the airbag should be deployed during a collision.

A number of techniques have been used to engineer vehicle occupant sensors. For example, a strain gauge can be placed in a car seat in order to determine whether there is a weight on the seat. A disadvantage of using a strain gauge, however, is that that the airbag may needlessly deploy if the seat is occupied by objects and packages, such as groceries, instead of a passenger.

Some vehicle occupant sensors work by detecting a change in an electric or magnetic field in the presence of a passenger by using, for example, a capacitance sensor or an inductive coil placed under the seat. Such systems, however, typically operate at a single frequency and are unable to determine the position and size of the seat occupants.

What are needed are circuits and systems that can more accurately detect the presence of a passenger in a vehicle car seat.

SUMMARY OF THE INVENTION

In an embodiment of the present invention, a method for sensing a body is disclosed. The method includes measuring an impedance of a body occupying a seat over a plurality of frequencies and comparing the measured impedance of the body with a predefined body model. The method also includes determining whether the predefined body model corresponds to the measured impedance of the body.

The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the embodiments of the present invention are discussed in detail below. It should be appreciated, however, that the present invention provides many applicable inventive concepts that can be embodied in a wide variety of specific contexts. The specific embodiments discussed are merely illustrative of specific ways to make and use the invention and do not limit the scope of the invention.

The present invention will be described with respect to embodiments in a specific context, namely an occupant sensor for airbag deployment control. The invention may also be applied in other contexts, such as detecting the presence of a human or other body occupying a space.

Figure 1A:
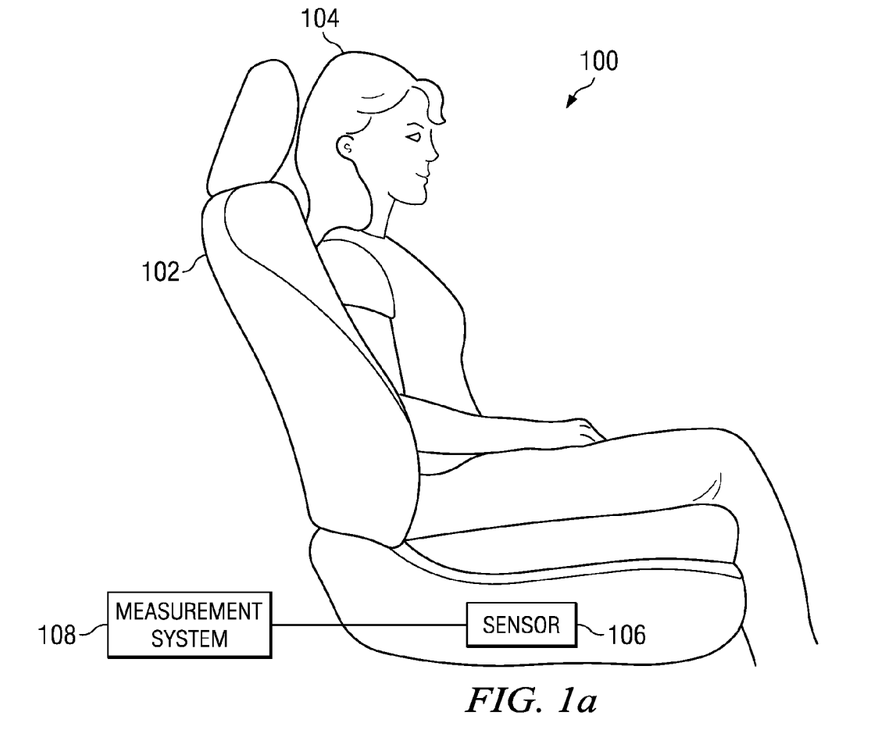
FIG. 1a illustrates an occupant detection system.

FIG. 1a illustrates occupant detection system 100 for automotive car seat 102. At a basic level, an automotive occupant detection system has sensor 106 that detects the presence of body 104 in car seat 102. Sensor 106 is typically coupled to measurement system 108, which processes the output of sensor 106 and makes a determination of whether or not seat 102 is occupied. Based on this determination, a decision can be made whether or not to deploy an airbag in the event of a collision.

Figure 1B:
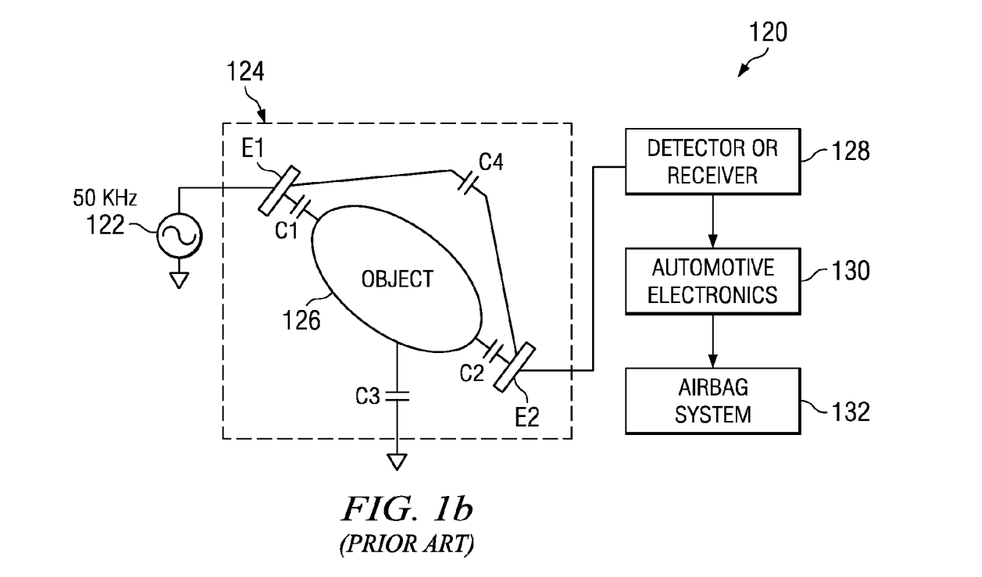
FIG. 1b illustrates a conventional occupant detection system.

Turning to FIG. 1b, a conventional occupant detection system 120 is illustrated. Occupant detection system 120 has signal generator 122 and detector 128 coupled to electrodes E1 and E2 within car seat 124. Signal generator 122 outputs a signal at about 50 KHz, which is measured through car seat 124 and object 126 by detector 128. The results of the measurement is sent to automotive electronics 130, typically a microprocessor. The results of these detection measurements are used to determine whether or not airbag system 132 deploys the airbag.

Occupant detection system 120 detects the presence of object 126 by sensing if the output of signal generator 122 is coupled through object 126 and its surrounding coupling capacitances C1 and C2 and object 126. Object 126 represents a passenger or other object that occupies the car seat, capacitor C1 represents the coupling capacitance between electrode E1 and object 126, and C2 represents the coupling capacitance between electrode E2 and object 126. The capacitance from object 126 to ground is represented by capacitor C3 and the parasitic coupling capacitance from electrodes E1 to E2 is modeled by capacitor C4. Capacitances C1, C2 and C3 are typically on the order of between about 50 pF and about 200 pF depending on the implementation. Capacitance C4 is typically between about 5 pF and about 20 pF depending on the size and placement of electrodes E1 and E2.

If object 126 is a human body, object 126 appears an equipotential surface at the signal generator's frequency of 50 KHz, and appears as a low impedance or an electrical short between C1 and C2. At frequencies in the KHz range, the impedances of C1 and C2 are in the MΩ range, which are typically orders of magnitude larger than the impedance of object 126. Consequently, the occupant detection system 120 only detects the simple presence or absence of a low impedance object in car seat 124.

In embodiments of the present invention, the presence of a human body is detected by performing an impedance measurement at frequencies between about 100 KHz and about 10 MHz. Alternatively, other frequency ranges can be used. At higher frequencies, the impedance of coupling capacitances are lower, therefore, the impedance of the human seat occupant becomes more dominant. In embodiments of the present invention, unique impedance characteristics of the human body, such as the dispersive impedance of the human body, at these higher frequencies are then used to identify the presence of a human body. Furthermore, multiple human impedance models can be used to identify a passenger's seat position (i.e. whether the passenger is sitting forward or back in his seat), or whether the passenger is an adult or a child.

Figures 2A, 2B:
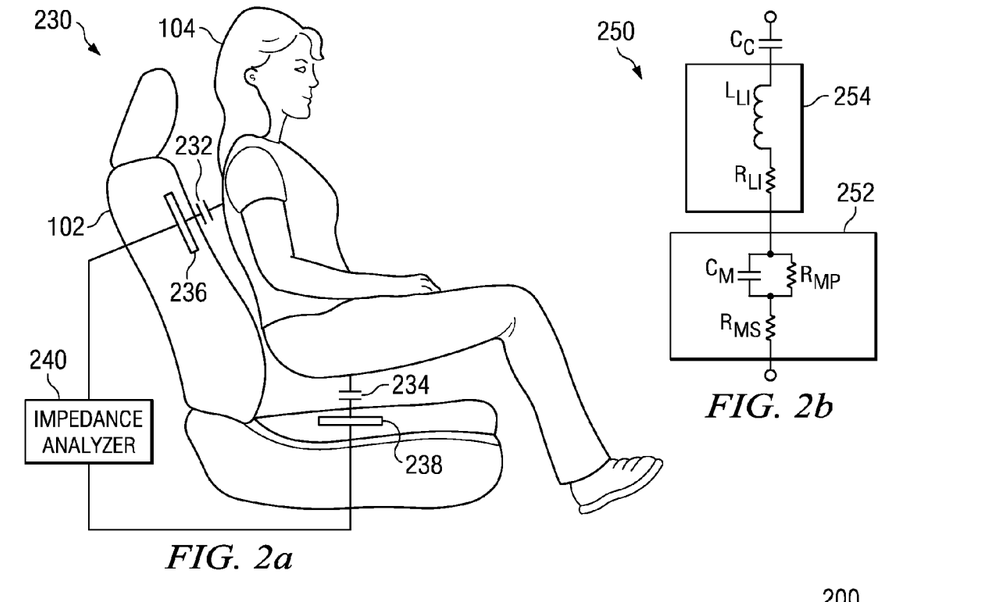
FIGS. 2a-2c illustrate an embodiment occupant detection system.

An embodiment vehicle occupant detection system 230 is illustrated in FIG. 2a. Impedance analyzer 240 measures the impedance of body 104 in seat 102 by using electrodes 236 and 238. The results of the impedance measurement are compared to impedance model 250 of FIG. 2b that models human body impedance 252, line impedance 254 to electrodes 236 and 238, and capacitance $C_C$ that models coupling capacitances 232 and 234 (FIG. 2a) between body 104 and electrodes 236 and 238. Human body impedance 252 models the human body as capacitance $C_M$ in parallel with resistance $R_{MP}$ and in series with resistance $R_{MS}$. In preferred embodiments, human body impedance model 252 is a dispersive impedance model that models the impedance characteristics of the human body.

Figure 2C:
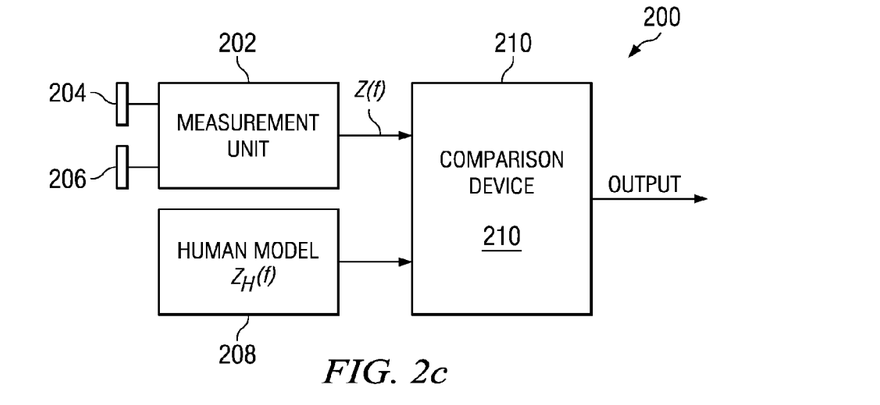

Turning to FIG. 2c, an embodiment vehicle occupant detection system 200 is illustrated. Detection system 200 has measurement unit 202, comparison device 210 and human body model 208. Measurement unit 202 is configured to take an electrical measurement of a body over frequency via electrodes 204 and 206 and output a resulting impedance Z69, where f is the frequency in Hz. Alternatively, measurement unit 202 can output an admittance Y69, s-parameters or other electrical network measurement. In embodiments of the present invention, measured impedance Z(f) is compared to a human body model impedance $Z_H(f)$ by comparison device 210, which outputs signal OUTPUT indicating whether or not Z(f) corresponds with $Z_H(f)$. In embodiments of the present invention, signal OUTPUT is a binary logic signal that indicates whether or not there is a correspondence between Z(f) and $Z_H(f)$. In alternative embodiments of the present invention, however, OUTPUT can be a multistate or numeric output that indicates a metric or degree of correlation between Z(f) and $Z_H(f)$.

In embodiments of the present invention, comparison device 210 compares Z69 to $Z_H(f)$ using a least mean square (LMS) algorithm. Other processing may occur prior to the LMS comparison, for example, Z(f) can be rescaled to correspond to the scale of $Z_H(f)$, or a constant bias of Z(f) can be removed. In alternative embodiments of the present invention, other comparison techniques known in the art, such as performing a correlation between Z(f) and $Z_H(f)$ can be used.

Figure 3A:
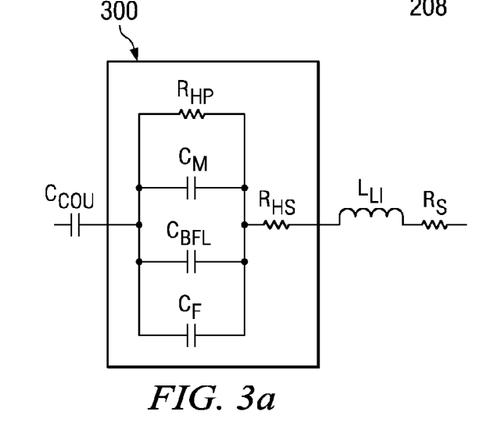
FIGS. 3a-3f illustrate an embodiment dispersive human body impedance model.

FIG. 3a illustrates a schematic of an embodiment human body mode 300. Human body model 300 has resistance $R_{HP}$, which models a parallel resistance, and resistance $R_{HS}$, which models a series resistance. Human body model 300 also has dispersive capacitors $C_M$, which models muscle, $C_{BF}$, which models body fluids, and $C_F$, which models body fat. These dispersive capacitors $C_M$, $C_{BFL}$, and $C_F$, which have a frequency dependent capacitance, can be expressed as:

$$C_{BFL}(\omega) = \epsilon_0 \cdot A_{BFL} \cdot \epsilon_{BFL}(\omega)$$

$$C_F(\omega) = \epsilon_0 \cdot A_F \cdot \epsilon_F(\omega)$$

$$C_M(\omega) = \epsilon_0 \cdot A_M \cdot \epsilon_M(\omega)$$

where $\epsilon_0$ is the permittivity of free space and $\epsilon_{BFL}(f)$, $\epsilon_F(f)$, and $\epsilon_M(f)$ are frequency dependent relative permittivities of body fluid, fat and muscle, respectively. $A_{BFL}$, $A_F$ and $A_M$ are tissue geometry parameters corresponding to body fluid, fat and muscle, respectively. In some embodiments of the present invention, these parameters are derived empirically by performing a curve-fit using a method of least squares to measured human body data. Resistance $R_{HS}$ is models charged particles within human tissue. In other embodiments of the present invention, however, a measured human body impedance $Z_H(f)$ can be used for the dispersive human body impedance model without breaking the impedance down into its individual physical parameters. In alternative embodiments of the present invention, other elements and parameters can be added to impedance model 300. In further embodiments, other topologies can also be used for impedance model 300.

In embodiments of the present invention, impedances $C_{COU}$, $L_{LI}$, and $R_S$ external to model 300 can be used to model electrode to body capacitance, line inductance and parasitic series resistance respectively. Preferably, these external parameters are determined according the individual car seat, either by preset parameters, or by performing a calibration procedure at manufacture or during operation of the automobile. In preferred embodiments, measurement unit 202 (FIG. 2c) is located in the seat of the vehicle, and cable lengths for wiring the system are less than about 3 meters long. With short cables, the impedance contribution of the cables are typically less than the impedance contribution of a human passenger, and calibration of the cable itself may not be necessary in some embodiments. Furthermore, in some embodiments of the present invention, the decision made by comparison device 210 (FIG. 2c) regarding the occupancy status of car seat 102 (FIG. 2a) is not based on the absolute value of one model parameter, but is based on the quality of fit of human impedance model $Z_H(f)$ to measured human impedance Z(f). In alternative embodiments of the present invention where measurement unit 202 (FIG. 2c) is located at a distance from car seat 102, calibration may be necessary.

Figure 3B:
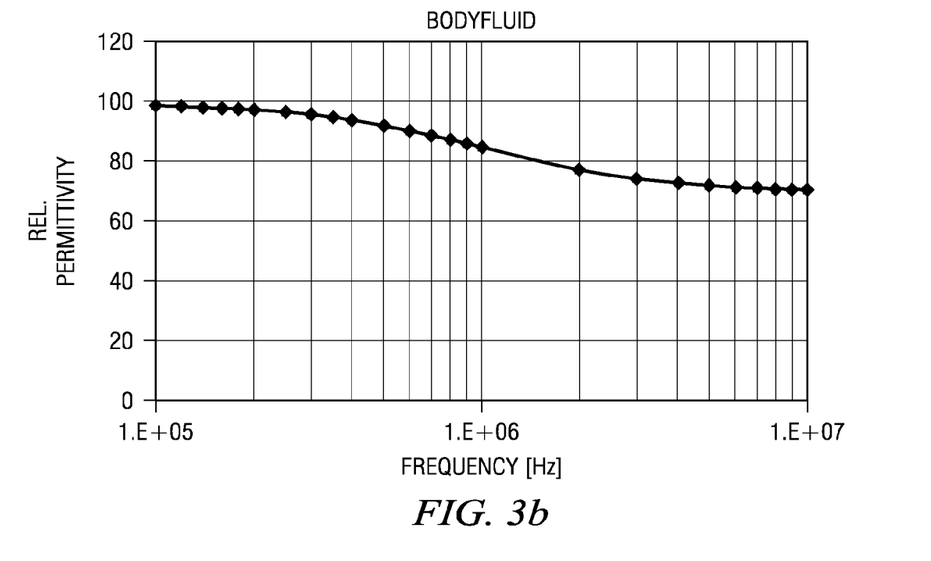
Figure 3C:
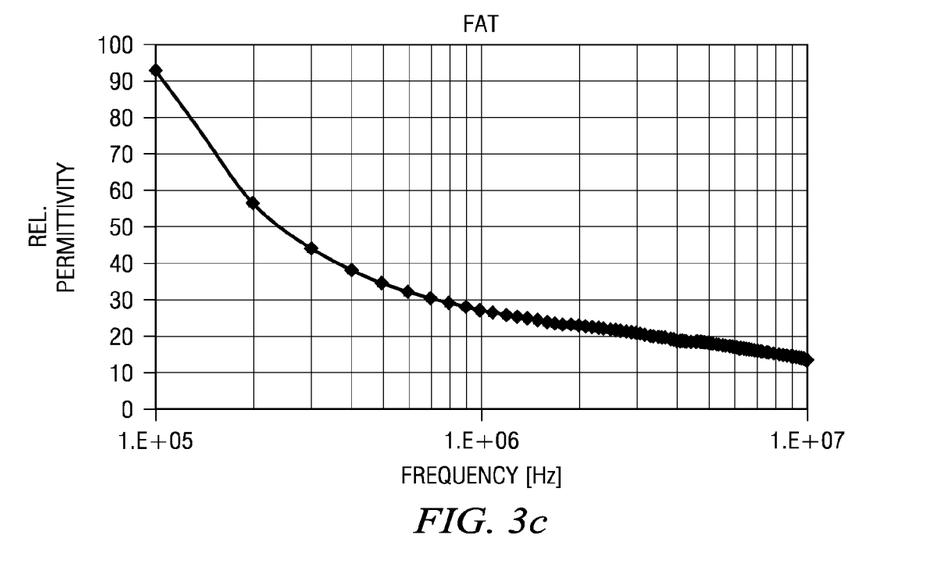
Figure 3D:
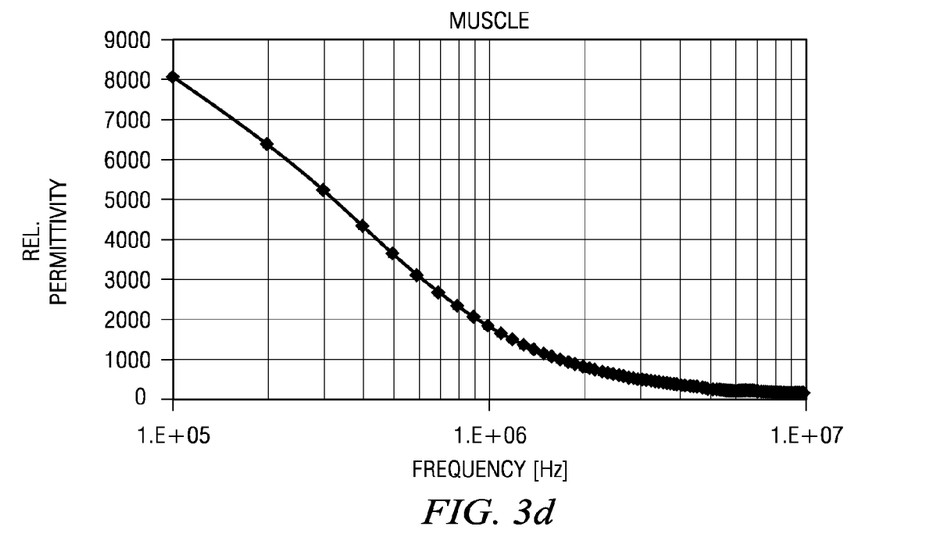
Figure 3E:
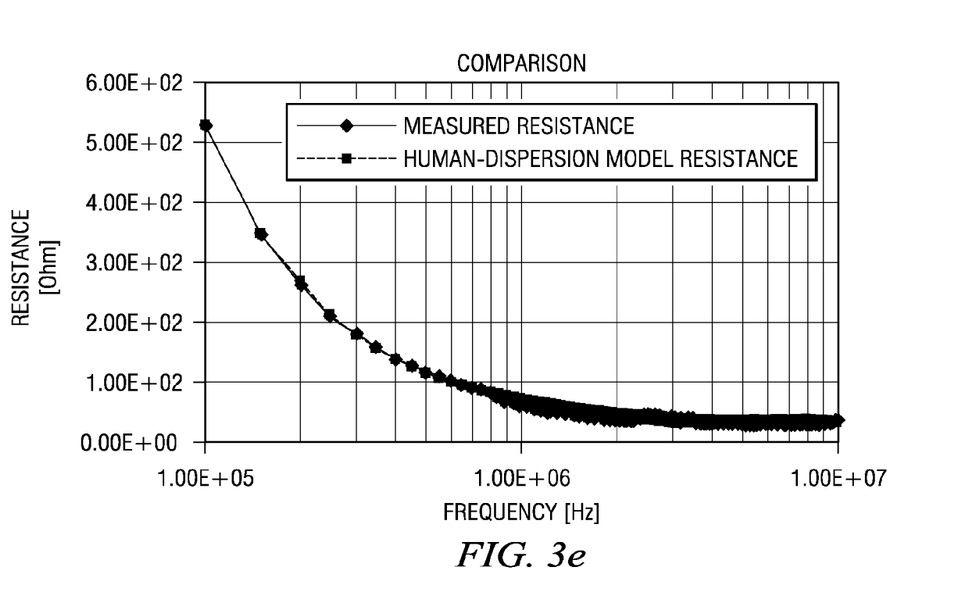
Figure 3F:
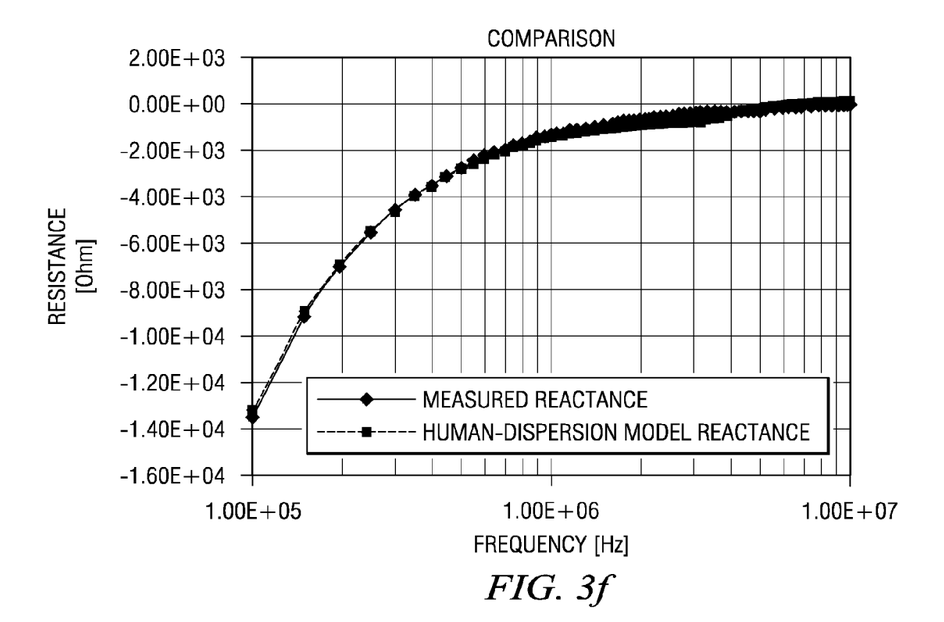

FIG. 3b illustrates a graph of the relative permittivity of body fluid $\epsilon_{BFL}(2\pi f)$ over frequency, FIG. 3c illustrates a graph of the relative permittivity of body fat $\epsilon_F(2\pi f)$ over frequency, and FIG. 3d illustrates a graph of the relative permittivity of muscle $\epsilon_{BFL}(2\pi f)$ over frequency for an embodiments of the present invention. These permittivities can be measured and/or derived using techniques known in the art. FIGS. 3e and 3f illustrate a comparison between a measured human impedance and a human impedance derived from impedance model 300 of FIG. 3a. FIG. 3e is a comparison of the resistive component, R(f) and FIG. 3f is a comparison of the reactive component X(f), where Z(f)=R(f)+X(f).

Figure 4A:
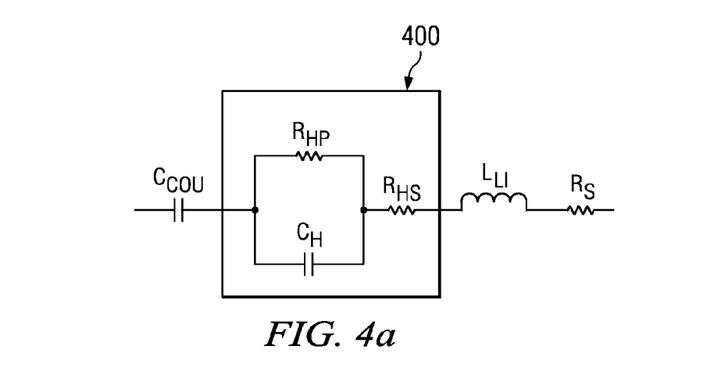
FIG. 4a illustrates an embodiment non-dispersive human body impedance model.

Turning to FIG. 4a, non-dispersive human body impedance model 400 can be used in alternative embodiments of the present invention. Like the dispersive model of FIG. 3a, non-dispersive model 400 has resistance $R_{HP}$, which models a parallel resistance, and resistance $R_{HS}$, which models a series resistance. Human body capacitance, however, is modeled as a single capacitor $C_H$. $C_{COU}$, $L_{IU}$, and $R_S$ external to model 300 can be used to model electrode to body capacitance, line inductance and parasitic series resistance respectively. In alternative embodiments of the present invention, other non-dispersive impedance elements can be added to non-dispersive model 400. In further alternative embodiments, other topologies for non-dispersive human impedance model 400 can also be used.

Figure 4B:
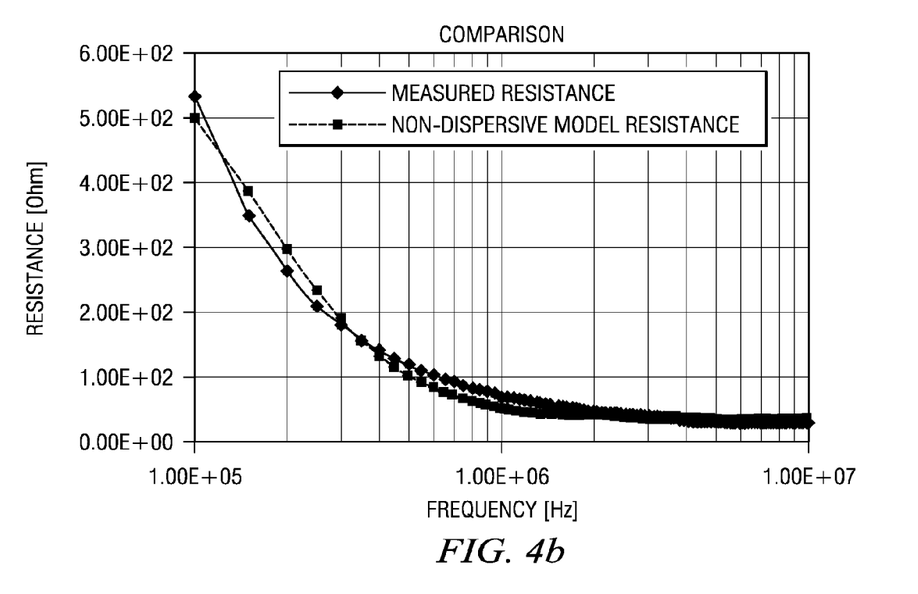
FIGS. 4b-4d illustrate graphs of comparisons between embodiment dispersive and non-dispersive human body impedance models.
Figure 4C:
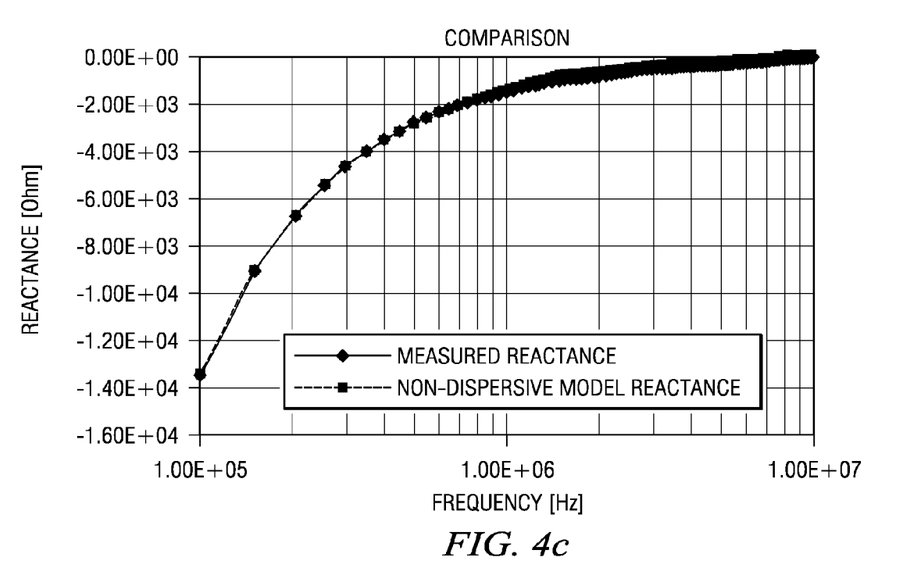

FIGS. 4b and 4c illustrate a comparison between a measured human impedance and a human impedance derived from non-dispersive impedance model 400 of FIG. 4a. FIG. 4b is a comparison of the resistive component, R(f) and FIG. 4c is a comparison of the reactive component X(f), where Z(f)=R(f)+X(f). It can be seen that the comparison between the measured and modeled results are not as close as the modeled results using the dispersive model, as illustrated in FIGS. 3e and 3f.

Figure 4D:
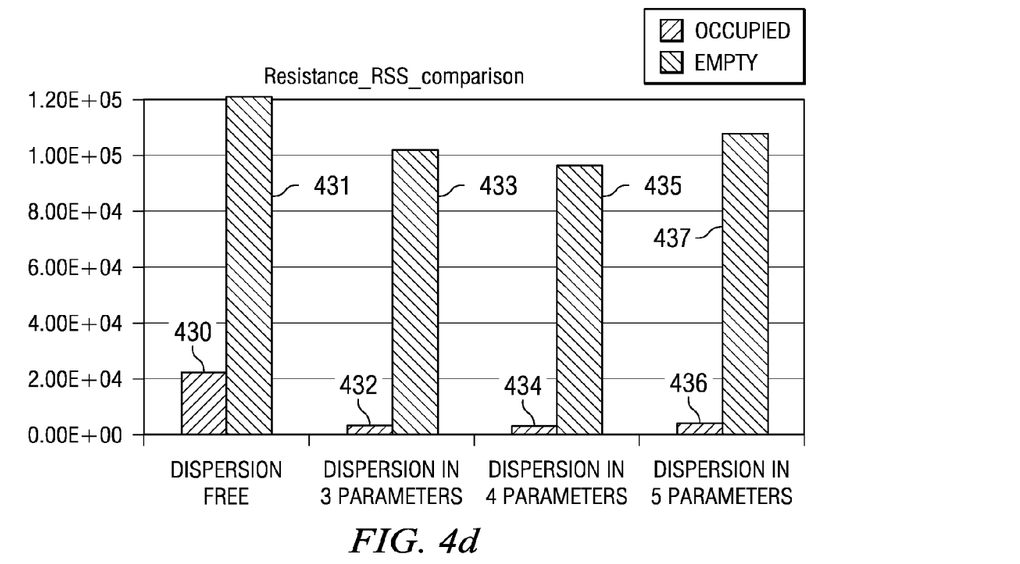

FIG. 4d illustrates a comparison of the quality of the dispersive and non-dispersive models with regard to the residual sum of squares (RSS) for the resistance component (real impedance component) of embodiments of the present invention. RSS values for occupied versus empty seats are shown for a dispersion free model (430 and 431), a three parameter dispersive model (432 and 433), a four parameter dispersive model (434 and 435) and a five parameter dispersive model (436 and 437). The three parameter dispersive model models fat, body fluid and muscle tissue, while the four and five parameter model also models other human impedance parameters such as blood and skin tissue. The four parameter includes fat, body fluid, muscle and skin tissue; and the five parameter model includes fat, body fluid, muscle, blood and skin tissue.

In embodiments of the present invention, a smaller RSS value corresponds to a better human body model fit to an impedance measurement. Consequently, the RSS is lower for occupied seat measurements 430, 432, 434 and 436 than they are for empty seat measurements 431, 433, 435 and 437. Occupied seat RSS values 432 434 and 436 for dispersive models are less than they are for the occupied seat value 430 for the non-dispersive model. It can be seen that RSS measurements 432 434 and 436 for three, four and five parameter models are similar in magnitude for an occupied seat. In preferred embodiments, therefore, three parameter dispersive models are used. In alternative embodiments of the present invention however, more or less dispersive parameters can be used. In further applications and embodiments, however, the non-dispersive model may be sufficient to detect the presence of a body.

In an embodiment of the present invention, a presence of a human passenger is detected if an impedance measurement yields an RSS value less than about a 20,000 threshold when using a dispersive model. The absolute RSS values, however, are dependent on the particulars setup of the seat, electrodes and measurement algorithm. In alternative embodiments of the present invention, other RSS values may result using other embodiment measurement setups. RSS threshold values for human detection, therefore, can vary across embodiments.

Figure 5:
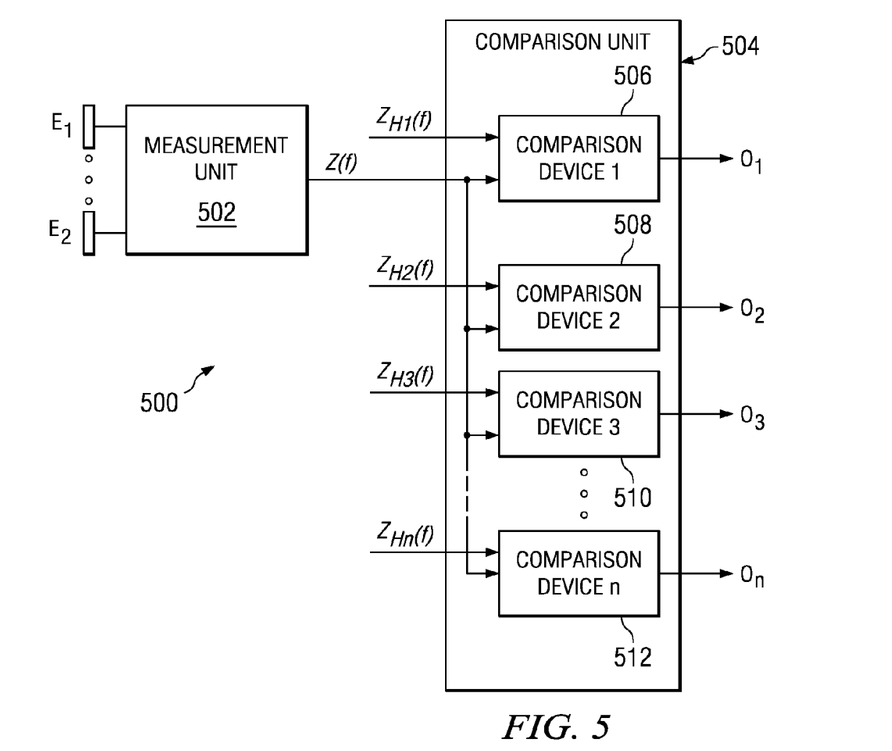
FIG. 5 illustrates an alternative embodiment occupant detection system.

Turning to FIG. 5, an alternative embodiment of occupant detection system 500 is illustrated. Occupant detection system 500 has measurement unit 502 having electrodes E1 and E2. Comparison unit 504 is shown with n comparison devices 506 508 510 and 512. Each of these comparison devices compare the measurement output Z(f) with human body impedance models $Z_{H1}(f)$ through $Z_{Hn}(f)$. Each of these human body impedance models $Z_{H1}(f)$ through $Z_{Hn}(f)$ model human body impedance in different situations. Separate models can be used to model, for example, an empty seat, a person sitting back into the seat or a person sitting forward. These impedance models can also be used to model persons of various heights and weights or ages in some embodiments. For example, an impedance model of a small child can be used to detect the presence of a small child to prevent the airbag from deploying in embodiments of the present invention.

Outputs $O_1$ though $O_n$ provide a measure of comparison between measured impedance Z(f) and human impedance models $Z_{H1}(f)$ through $Z_{Hn}(f)$ in embodiments of the present invention. These outputs can be used by the automotive electronic system to determine which of the human impedance models $Z_{H1}(f)$ through $Z_{Hn}(f)$ provide the best fit. In alternative embodiments, where a comparison unit 504 determines which human impedance model $Z_{H1}(f)$ through $Z_{Hn}(f)$ comprises the closest match to measured impedance Z(f), outputs $O_1$ though $O_n$ are configured as an output word that indicates which model provides the best fit. Alternatively, other output data formats and strategies can be used.

Figure 6:
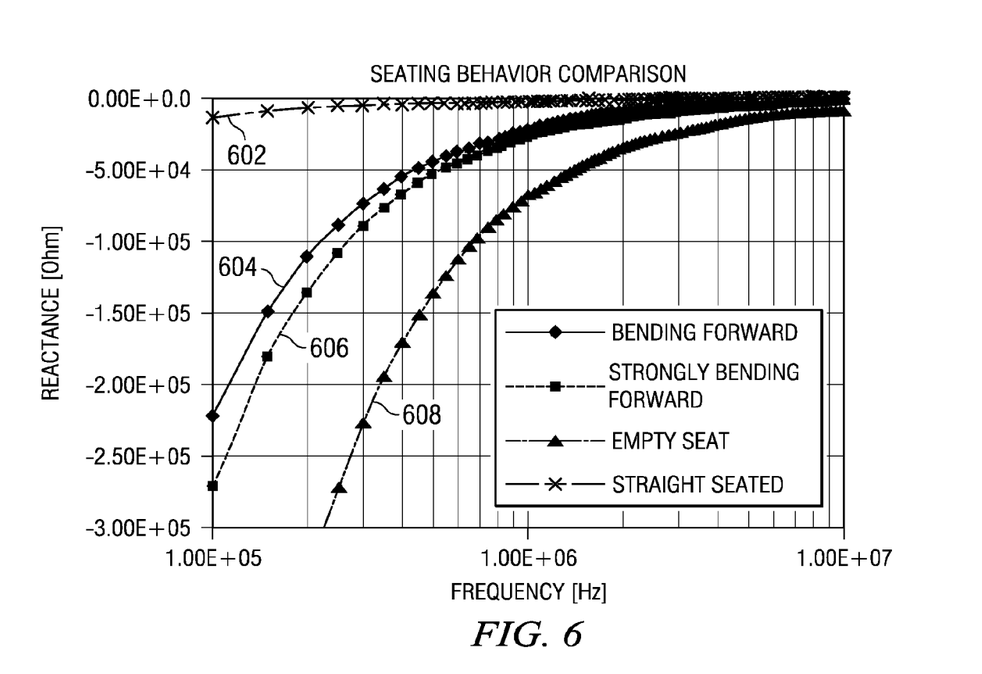
FIG. 6 illustrates a graph of the performance of an embodiment occupant detection system.

FIG. 6 illustrates a family of embodiment reactance curves 602 604 606 and 608 that correspond with human impedance models of a person sitting in different positions. Curve 608 is a reactance curve of an empty seat, curve 606 is a reactance curve of a person strongly bending forward, curve 604 is a reactance curve of a person bending forward, and curve 602 is a reactance curve of a person sitting straight in a seat. Corresponding embodiment values for $C_{COU}$ (derived using a least-squares method) in dispersive model 300 (FIG. 3a) are about 2.4 pF for the empty seat, 126.3 pF for the straight seated person, 7.2 pF for the person bending forward and 5.9 pF for the person strongly bending forward. In alternative embodiments of the present invention, the types of models used and their corresponding numerical behavior may vary according to the embodiment.

Figure 7A:
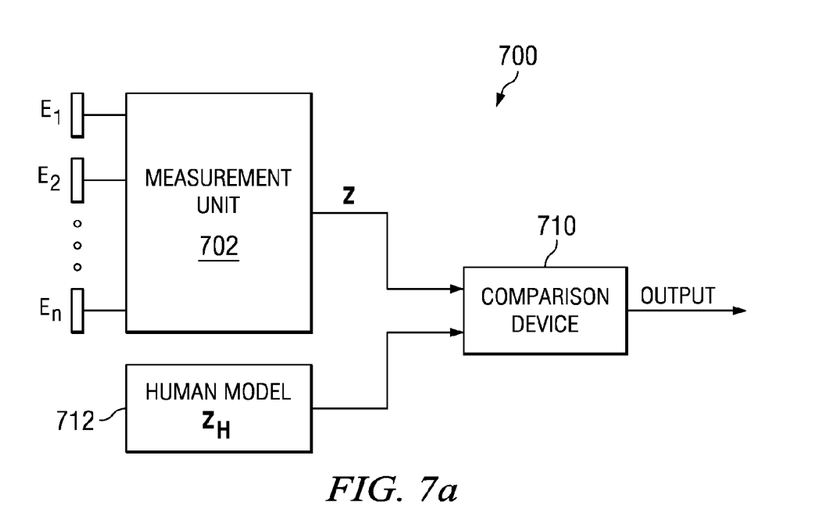
FIGS. 7a-7b illustrate a further embodiment occupant detection system.

FIG. 7a illustrates a further embodiment occupant detection system. Occupant detection system 700 has measurement unit 702, comparison unit 710 and human model 712. Measurement unit 702, however has a plurality of electrodes $E_1$ through $E_n$. The output of measurement unit 702 is a measured impedance matrix Z. Human body model 712 provides an impedance matrix $Z_H$ as well. In some embodiments of the present invention Z and $Z_H$ are n×n matrices in the form:

$$Z = \begin{bmatrix} Z_{11}(f) & Z_{12}(f) & \ldots & Z_{1n}(f) \\ Z_{21}(f) & Z_{22}(f) & \ldots & Z_{2n}(f) \\ \vdots & \vdots & \ddots & \vdots \\ Z_{n1}(f) & Z_{n2}(f) & \ldots & Z_{nn}(f) \end{bmatrix} \text{ and}$$

$$Z_H = \begin{bmatrix} Z_{H11}(f) & Z_{H12}(f) & \ldots & Z_{H1n}(f) \\ Z_{H21}(f) & Z_{H22}(f) & \ldots & Z_{H2n}(f) \\ \vdots & \vdots & \ddots & \vdots \\ Z_{Hn1}(f) & Z_{Hn2}(f) & \ldots & Z_{Hnn}(f) \end{bmatrix}$$

In some embodiments of the present invention, not all elements of Z may be used. In other embodiments of the present invention, measurement unit 702 can output another type of matrix such as an admittance matrix Y, or other matrix, for example.

Figure 7B:
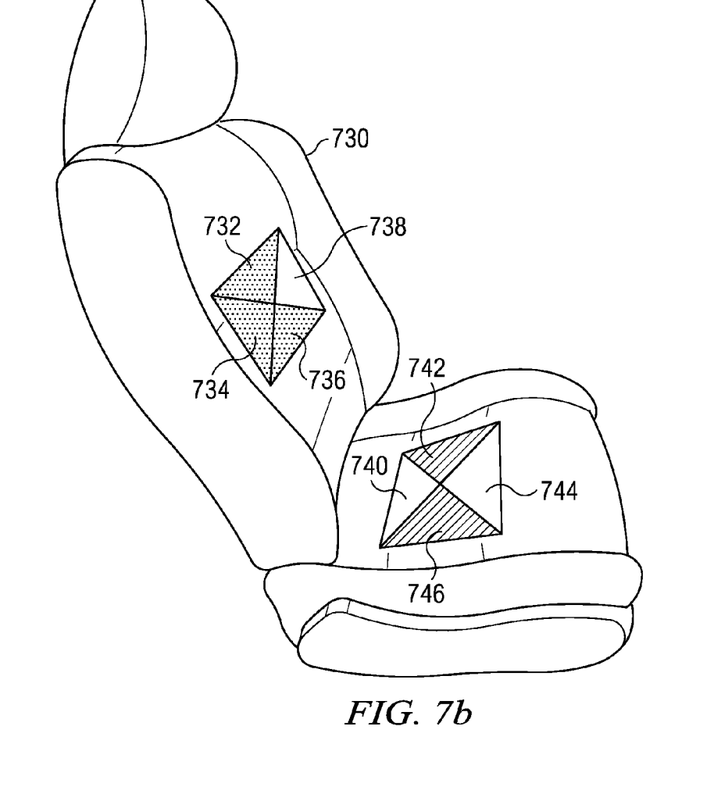

FIG. 7b illustrates an embodiment electrode configuration for car seat 730 that can be used to form an impedance matrix as described hereinabove with respect to the embodiment of FIG. 7a. Electrodes 732, 734, 736 and 738 are arranged on back of seat 730 and electrodes 740, 742, 744 and 746 are arranged on the bottom portion of seat 730. In an embodiment of the present invention, different potentials are applied to different electrodes. For example, a high potential and/or high current is applied to electrodes 732, 736 and 734, a low potential and/or current is applied to electrodes 742 and 746, and electrodes 738, 740 and 744 are left floating. In preferred embodiments, high potentials and currents are on the order of about 1 Vrms and 10 mArms, respectively; and low potentials and currents are on the order of about 5 mVrms and about 100 µA, respectively. In alternative embodiments, however, these high and low potential currents can be different depending on the application. An impedance matrix is derived with respect to electrodes 732, 734, 736, 738, 740, 742, 744 and 746. Each different electrode setup can correspond to an entry in the impedance matrix that is compared to model impedances. In alternative embodiments, however, different electrode configurations, different potentials and/or currents, different electrode assignments and different numbers of electrodes can be used.

Figure 8:
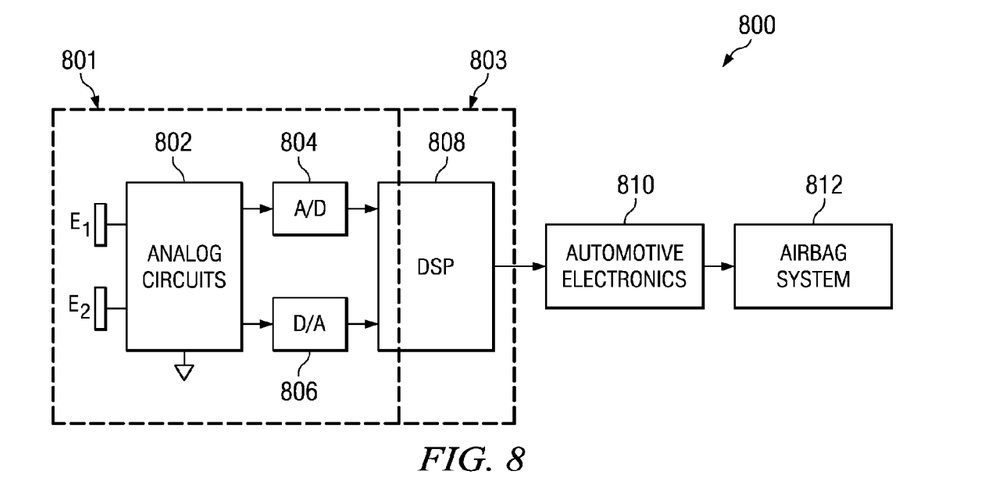
FIG. 8 illustrates a digital signal processing (DSP) based embodiment of the present invention.

FIG. 8 illustrates an embodiment implementation of occupant detection system 800. Occupant detection system has electrodes E1 and E2, analog circuits 802, analog-to-digital (A/D) converter 804, digital-to-analog converter (D/A) 806, and digital signal processing (DSP) block 808. The output of DSP block 808 is coupled to automotive electronics 810, which is, in turn, coupled to airbag system 812.

In embodiments of the present invention the, electrodes E1 and E2, analog circuits 802, A/D 804, D/A converter 806 and a portion of DSP 808 implement impedance measurement unit 801. In one embodiment, for example, DSP 808 generates a digital representation of a frequency varying test signal, such as a frequency swept sinewave, and outputs the test signal to D/A 806. D/A converter 806 converts the digitally represented test signal to the analog domain and outputs the signal to analog circuits 802, which has circuitry to interface the test signal with either one or both of electrodes E1 and E2.

Embodiments of analog circuit section 802 also has circuitry, such as amplifiers, filters, and other analog signal conditioning circuits, to receive and amplify signals from one or both electrodes E1 and E2, and output conditioned received signals to A/D 804. Analog section 802 can be designed according to techniques known in the art. A/D 804 converts the conditioned received signals to the digital domain for processing by DSP 808. With knowledge of the transmitted and received signals DSP 808 preferably derives body impedances based on these signals. These derived body impedances can then be stored in memory either internal or external to DSP 808.

DSP 808 is also configured to function as the comparison block 803 in embodiments of the present invention. Human body impedance models are stored in memory internal and/or external to DSP 808 and are compared to the stored values of measured impedances. DSP 808 is configured to run an algorithm to determine whether the measured body impedance is sufficiently correlated to the stored human body impedance model. In preferred embodiments of the present invention, the mean-square error between the measured and modeled impedance is calculated. A determination of whether or not to deploy the air bag is made by automotive electronics 810 based on the electrode configuration used for the measurement, the mean-square error between the measured and modeled impedance, the model parameter $C_c$ and the model parameter $R_{HS}$. Alternatively, the determination can be made by DSP 808.

It can further be seen that in alternative embodiments of the present invention, other architectures can be used to implement the occupant detection system. A fully analog system, a digital system that uses a CPU or microprocessor to implement portions of the system, or other combinations of analog and digital circuitry can be used. For example, D/A converter 806 could be replaced by a digitally controlled oscillator, or an analog or mixed-signal circuit could be used to decide which of the human body models most closely corresponds with the measured impedance.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for sensing a body comprising:
   measuring an impedance of a body occupying a seat over a plurality of frequencies, measuring the impedance of the body comprising measuring the impedance of the body with a plurality of electrodes;
   comparing the measured impedance of the body with a predefined body model over the plurality of frequencies; and
   determining whether the predefined body model corresponds to the measured impedance of the body.

2. The method of claim 1, wherein measuring the impedance of the body comprises forming a measurement matrix based on the measuring.

3. The method of claim 1, wherein comparing comprises using a fitting procedure to determine whether the predefined body model corresponds to the measured impedance of the body.

4. The method of claim 3, wherein the fitting procedure comprises a least mean squares (LMS) algorithm.

5. The method of claim 3, wherein the fitting procedure comprises computing a residual sum of squares (RSS).

6. The method of claim 1, wherein the predefined body model comprises a human body model.

7. The method of claim 1, wherein the predefined body model comprises a dispersive impedance model.

8. The method of claim 7, wherein the dispersive impedance model comprises a frequency dependent capacitance or permittivity.

9. The method of claim 1, wherein:
   comparing the measured impedance of the body with the predefined body model comprises comparing the measured impedance of the body with a plurality of predefined body models; and determining whether the predefined body model corresponds to the measured impedance of the body comprises determining which one of the plurality of predefined body models most closely corresponds to the measured impedance of the body.

10. The method of claim 9, wherein one of the plurality of body models corresponds to an adult human sitting in a car seat.

11. The method of claim 1, wherein at least one of the plurality of frequencies comprises a frequency greater than 1 MHz.

12. A system for determining a presence of a body, the system comprising:
an impedance measurement unit comprising a plurality of electrodes, the impedance measurement unit configured to output a measured body impedance over a plurality of frequencies; and
a comparison unit comprising
a first input coupled to an output of the impedance measurement unit,
a second input coupled to a body impedance model defined over the plurality of frequencies, and
an output configured to indicate a correlation between the body impedance model and the measured body impedance, the correlation being computed over the plurality of frequencies.

13. The system of claim 12, wherein the body impedance model comprises a human body impedance model.

14. The system of claim 12, wherein the body impedance model comprises a dispersive impedance.

15. The system of claim 12, wherein the body impedance model comprises a frequency dependent capacitive component.

16. The system of claim 12, wherein the body impedance model comprises a plurality of models.

17. The system of claim 16, wherein the output of the comparison unit is further configured to indicate which of the plurality of models most closely correlates with the measured body impedance.

18. The system of claim 17, wherein
a first of the plurality of models comprises a model of an adult seated in a car seat; and
a second of the plurality of modes comprises a model of a child seated in a car seat.

19. The system of claim 17, wherein the comparison unit uses a least-squares algorithm to determine which of the plurality of models most closely correlates with the measured body impedance.

20. The system of claim 12, wherein the second input of the comparison unit comprises a plurality of second inputs coupled to a plurality of body impedance models, and the output of the comparison is further configured to indicate which of the plurality of second inputs most closely corresponds to the first input.

21. The system of claim 12, wherein the impedance measurement unit further comprises a signal generator.

22. The system of claim 12, wherein:
the plurality of electrodes comprises at least three electrodes; and
the impedance measurement unit is configured to output the measured body impedance in a form of a matrix.

23. The system of claim 22; wherein the matrix comprises an admittance matrix.

24. The system of claim 12, wherein the comparison unit is disposed on an integrated circuit.

25. The system of claim 24, wherein the comparison unit comprises a digital signal processor (DSP).

26. A method for sensing a presence of a human body in a car seat comprising:
measuring an impedance of a car seat over a plurality of frequencies;
deriving a measured impedance based on the measuring;
correlating the measured impedance with a pre-defined human body model defined over at least two of the plurality of frequencies, the pre-defined human body model comprising a dispersive impedance; and
based on the correlating, determining whether the measured impedance matches the pre-defined human body model.

27. The method of claim 26, further comprising deciding whether to deploy an airbag based on the determining.

28. The method of claim 26, further comprising deriving the pre-defined human body model.

29. The method of claim 26, wherein measuring an impedance of a car seat over a plurality of frequencies comprises measuring the impedance using a plurality of electrodes.

30. A system for sensing a presence of a human body in a car seat, the system comprising:
an impedance measurement device comprising a plurality of electrodes, the impedance measurement device configured to output a measured car seat impedance over a plurality of frequencies; and
a comparison device comprising
a first input coupled to the output of the impedance measurement device,
a second input coupled to a human body impedance model defined over the plurality of frequencies, and
an output configured to indicate whether the measured car seat impedance is correlated to the human body impedance model based on a correlation taken over at least two of the plurality of frequencies.

* * * * *